United States Patent [19]
Li et al.

[11] Patent Number: 6,162,358
[45] Date of Patent: Dec. 19, 2000

[54] HIGH FLUX REVERSE OSMOSIS MEMBRANE

[75] Inventors: Norman N. Li, Arlington Heights; Mark A. Kuehne, Evanston, both of Ill.; Robert J. Petersen, Minneapolis, Minn.

[73] Assignee: NL Chemicals Technologies, Inc., Mount Prospect, Ill.

[21] Appl. No.: 09/092,768

[22] Filed: Jun. 5, 1998

[51] Int. Cl.[7] .................................................. B01D 71/56
[52] U.S. Cl. ............. 210/500.38; 210/490; 210/500.37; 427/244; 427/245; 264/41
[58] Field of Search ......................... 210/500.37, 500.38, 210/490; 264/41; 427/244, 245

[56] References Cited

U.S. PATENT DOCUMENTS

| | | |
|---|---|---|
| 3,153,008 | 10/1964 | Fox . |
| 4,277,344 | 7/1981 | Cadotte . |
| 4,360,659 | 11/1982 | Sikdar ..................................... 528/196 |
| 4,474,858 | 10/1984 | Makino et al. ......................... 210/490 |
| 4,529,646 | 7/1985 | Sundet . |
| 4,643,829 | 2/1987 | Sundet . |
| 4,761,234 | 8/1988 | Uemura et al. . |
| 4,812,270 | 3/1989 | Cadotte et al. . |
| 4,872,984 | 10/1989 | Tomaschke . |
| 4,913,816 | 4/1990 | Waite ..................................... 210/490 |
| 4,948,507 | 8/1990 | Tomaschke . |
| 4,950,404 | 8/1990 | Chau . |
| 4,983,291 | 1/1991 | Chau et al. . |
| 5,073,176 | 12/1991 | Arthur . |
| 5,154,829 | 10/1992 | Degen et al. . |
| 5,234,598 | 8/1993 | Tran et al. ............................. 210/654 |
| 5,336,409 | 8/1994 | Hachisuka et al. ..................... 210/490 |
| 5,593,588 | 1/1997 | Kim et al. . |
| 5,614,099 | 3/1997 | Hirose et al. . |
| 5,650,479 | 7/1997 | Glugla et al. . |
| 5,674,398 | 10/1997 | Hirose et al. . |
| 5,693,227 | 12/1997 | Costa . |

OTHER PUBLICATIONS

M. Hirose et al., "Effect of Skin Layer surface structures on the flux behavior of RO membranes," J. Membrane Sci., 121 (1996), pp. 209–215.

A. Kulkarni et al., "Flux enhancement by hydrophilization of thin film composite . . . " J Membrane Sci, 114 (1996), pp. 39–50.

D. Mukherjee et al., "Flux enhancement of reverse osmosis membranes by chemical . . . " J. Membrane Sci., 97 (1994), pp. 231–249.

*Primary Examiner*—Ana Fortuna
*Attorney, Agent, or Firm*—Robert J. Petersen

[57] ABSTRACT

Reverse osmosis membranes with improved water flux and excellent solute rejection characteristics are formed by interfacial reaction of an essentially monomeric polyamine reactant having an average of at least two amine functional groups with an essentially monomeric amine-reactive reactant having an average of at least 2.05 acyl halide functional groups, the polymerization reaction being conducted in the presence of a monohydric phenol on the surface of a porous substrate. A specific example is a high flux composite membrane prepared by coating a porous substrate with an aqueous solution containing about 0.1–20 wt % m-phenylenediamine and 0.1–9.9 wt % phenol, and interfacially contacting the coated substrate with a nonaqueous solution of about 0.01–10 wt % trimesoyl chloride for a time sufficient to form a polyamide coating, followed optionally by one or more washing and drying steps to remove the nonaqueous solvent and most or all of residual unreacted chemicals.

19 Claims, No Drawings

HIGH FLUX REVERSE OSMOSIS MEMBRANE

FIELD OF THE INVENTION

The present invention relates to reverse osmosis membranes useful in water purification and aqueous separations, and more particularly to interfacially synthesized polyamide composite membranes having improved flux. The present invention also relates to processes for preparing the membranes.

BACKGROUND OF THE INVENTION

It is known that semipermeable membranes useful in various separations can be made by interfacial polymerization processes conducted on the surfaces of porous substrates. In particular, a variety of semipermeable membranes known in the art as thin-film-composite membranes have been under development since the 1960s, resulting in commercial products now widely used in water purification, brackish water desalting, and potable water production from seawater. Principal among these membranes are aromatic polyamides prepared by interfacial reaction of aqueous aromatic polyamines with nonaqueous polyacyl halides, wherein the interfacial reaction is customarily performed on the surface of porous polysulfone substrates, the latter being usually further supported by a backing of a woven or nonwoven fibrous polyester or polyolefinic web. These are commonly referred to as thin film composite membranes in the art. Most of the current membranes of this type find their origin in methods and compounds originally taught in U.S. Pat. No. 4,277,344, issued to Cadotte, wherein aromatic diamines were interfacially reacted with aromatic polyacyl halides, trimesoyl chloride being the most preferred polyacyl halide. The commercial success of interfacially formed, aromatic polyamide membranes made according to the teachings of Cadotte has resulted in various versions thereafter with equivalent or improved performance. Particularly noteworthy in commerce are membranes with competitive performance characteristics made by the method disclosed in U.S. Pat. No. 4,872,984, wherein an amine salt is included in the aqueous aromatic polyamine solution employed in the interfacial reaction step.

An area of continuing interest and need is to provide reverse osmosis membranes having greatly improved flux while maintaining solute rejection characteristics. Advantages to be derived from development of such membranes include less expensive membrane process equipment and lower energy consumption due to lower fluid pressures and pumping requirements. Efforts toward this end have included variations in the amines and acyl halides used in the interfacial polymerization, and the usage of various processing and flux-inducing additives. For example, U.S. Pat. No. 4,643,829 discloses a change of the acyl halide reactant to a cyclohexane-based analog, which results in higher flux membranes, but with some decrease in salt rejection levels. U.S. Pat. No. 4,812,270 discloses high flux membranes made by post-treatment of aromatic polyamide membranes with phosphoric and tannic acids, but having significantly lower sodium chloride rejections. U.S. Pat. No. 4,983,291 discloses post-treatment of an interfacial aromatic polyamide membrane with citric acid to improve flux while maintaining salt rejection. U.S. Pat. No. 4,950,404 discloses use of polar aprotic solvent additives in the aqueous polyamine solution to improve flux of resulting interfacially formed membranes while maintaining good salt rejection, these polar aprotic solvents being characterized by having a capability to dissolve or plasticize the underlying porous substrate. U.S. Pat. No. 5,674,398 discloses interfacial aromatic polyamide reverse osmosis membranes with excellent flux prepared with the aid of a condensation polymerization catalyst, particularly a 4-dialkylaminopyridine catalyst, these membranes having a mostly flat, featureless surface with reduced propensity to surface fouling tendencies compared with similar membranes generated according to the preceding disclosures. U.S. Pat. No. 5,614,099 on the other hand, discloses use of 10–40% isopropyl alcohol in the aqueous polyamine solution to generate interfacially synthesized aromatic polyamide membranes with a high degree of surface roughness, thereby achieving enhanced surface area, which is said to result in increased membrane flux in separations. These and other various approaches serve to underline the continuing quest for improved compositions and processes to provide reverse osmosis membranes with superior combinations of flux and solute rejection characteristics. The present invention represents a new and previously unforeseen alternative to the aforementioned approaches.

SUMMARY OF THE INVENTION

This invention provides reverse osmosis membranes which have a surprisingly improved flux of water when contacted with a pressurized feed water, and yet retain highly effective rejection characteristics toward solutes such as inorganic salts dissolved in the pressurized feed water. These membranes are formed by the interfacial reaction of an essentially monomeric polyamine reactant typically having an average of about two amine functional groups per monomer unit, with an essentially monomeric amine-reactive reactant preferably having an average of at least about 2.05 acyl halide functional groups per monomer unit, this interfacial reaction being conducted in the presence of a monohydric phenol, a polyamidic reaction product being formed thereby. The polyamidic reaction product resulting from the interfacial reaction is deposited on and/or within the surface of a porous substrate as a semipermeable thin coating. The action of the monohydric phenol in modifying the interfacially formed polyamidic reaction product provides semipermeable coatings having unexpectedly enhanced water flux while retaining excellent semipermeable characteristics. The monohydric phenol is believed to be incorporated into the polyamidic reaction product in minor amounts, thereby modifying this reaction product chemically through the presence of pendant phenolate ester groups.

The polyamine is preferably an aromatic diamine, and most preferably is at least one member of the group consisting of m-phenylenediamine, p-phenylenediamine, 4-chloro-1,3-phenylenediamine, 5-chloro-1,3-phenylenediamine, 3-chloro-1,4-phenylenediamine, and fluoro-analogs of these chloroamines. The polyacyl halide is preferably a cycloaliphatic or aromatic polycarboxylic acid halide, and more preferably includes one or more members of the group consisting of trimesoyl chloride, cyclohexanetricarbonyl chloride, trimellitoyl chloride, isophthaloyl chloride, and terephthaloyl chloride. The monohydric phenol may be any member of the class of aromatic compounds having a single hydroxyl group attached directly to the aromatic ring, including particularly any phenolic compound having a solubility in water of at least about 1.0 gram per liter. The monohydric phenol is preferably a member of the group consisting of phenol, guaiacol, m-methoxyphenol, p-methoxyphenol, o-fluorophenol, m-fluorophenol, p-fluorophenol, o-cresol, m-cresol, and p-cresol.

A specific embodiment of this invention is a process for producing a high flux semipermeable membrane by coating a porous substrate with an aqueous solution of about 0.1–20 wt % m-phenylenediamine and 0.1–9.9 wt % phenol, and interfacially contacting the coated substrate with a nonaqueous solution of trimesoyl chloride of about 0.01–10 wt % for a time sufficient to form an ultrathin, semipermeable, interfacially synthesized, solute-rejecting polyamidic coating on the porous substrate, followed preferably by one or more drying and/or washing steps to remove the nonaqueous solvent and most or all of residual unreacted chemicals.

Another specific embodiment of the invention is a high flux semipermeable membrane having an ultrathin, semipermeable, interfacially synthesized, solute-rejecting layer deposited on a surface of a porous substrate, this layer being primarily polyamidic, the permeability of this layer being enhanced by the action of, or incorporation of a portion therein of, one or more monohydric phenols.

Membranes made in accordance with this invention provide advantages of increased flux combined with retention of excellent solute rejection characteristics, being thus useful in membrane process equipment and systems that are less expensive to build and entail lower energy consumption due to lower fluid pressures and pumping requirements.

DETAILED DESCRIPTION OF THE INVENTION

The membranes of the invention may be prepared by the method generally described by Cadotte in U.S. Pat. No. 4,277,344, and alternately as further modified by Tomaschke in U.S. Pat. Nos. 4,872,984 and 4,948,507, these disclosures being herein incorporated by reference. In this general approach, an aqueous solution of a polyamine reactive toward acyl halides is coated on a porous substrate and the excess removed by draining, rolling, sponging, air knifing or other suitable techniques. The coating is preferably dried before proceeding. Thereafter the surface of the coated substrate is contacted with a nonaqueous solution of an amine-reactive polyacyl halide. The amine solution coating on the porous substrate reacts with the acyl halide to form a polymerized reaction product that is believed to be formed both on and within the porous top surface of the porous substrate, particularly when the amine solution coating is brought to dryness before exposure to the acyl halide solution. The resulting composite is then dried so as to remove, at a minimum, the nonaqueous solvent. The drying step may involve an elevated temperature of 50 to 120° C. and impingement of a gaseous atmosphere such as air or nitrogen. This provides a semipermeable membrane which exhibits good water permeation and good salt rejection when operated in contact with a pressurized aqueous feed solutions such as tapwater, brackish water, seawater or industrial feedstreams. By semipermeable membrane is meant a membrane that allows permeation of water through itself while showing significantly reduced permeation of dissolved solutes contained in the self-same water. Such semipermeability is generally described numerically by a term described as "percent solute rejection," more commonly as "percent salt rejection," since most solutes of interest are dissolved inorganic salts.

It has now been discovered that by adding to the aqueous solution of a polyamine reactant a monohydric phenol, the membrane formed by interfacial polymerization of the polyamine reactant with the polyacyl halide reactant exhibits a high water flux superior to membranes made by essentially identical procedures but in the absence of the monohydric phenol. It has been further discovered that such improved membranes generally retain their solute rejection characteristics. Such membranes made in accordance with the present invention embodied in this discovery are advantageous in that, as a result of the high water flux, they permit tapwater and brackish water treatment operations at much lower pressures while continuing to produce commercially acceptable permeate fluxes and permeate purities. This is particularly valuable in a variety of applications, including for example membrane softening of drinking water and tapwater purification for semiconductor chip manufacture.

In an embodiment of the invention, the semipermeable membranes of the present invention may be prepared by coating a porous substrate with an aqueous solution of an aromatic polyamine containing the monohydric phenol as an additive in this aqueous solution, then exposing the coated porous substrate to a nonaqueous polyacyl halide solution. The porous substrate may consist of an inorganic material such as a porous ceramic or glass. Preferably, however, the porous substrate will consist of a polymeric material. An optimal substrate material preferably contains interconnected pores in its matrix that are of sufficient size to permit essentially unimpeded passage of permeate through the substrate, while having surface pores of sufficiently small size to structurally support the thin interfacial layer deposited thereon, such that the thin interfacial layer can withstand contact with a pressurized feed solution at from 50 to as high as 1,500 psig without any undue damage to its integrity. The surface pores of the porous substrate preferably range in size from about 1 millimicron to about 100 millimicrons at the surface supporting the deposited interfacial layer. The pores of the porous substrate may vary considerably beneath this surface layer, and may range from 1 millimicron to as high as 25 microns. A graded porosity changing from a finely porous support surface to a coarsely porous back surface is particularly preferred.

Examples of polymeric porous substrates which may be used to prepare the desired composite membranes of the present invention include porous substrates made from polymer resins such as polysulfone, polycarbonate, polyphenylene oxide, polyimide, polyetherimide, polyetheretherketone (PEEK), and other such engineering plastics. Various polyolefins and halogenated polyolefins such as polypropylene, polymethylpentene, polyvinyl chloride and polyvinylidene fluoride may also be employed. Methods of making porous films and fibers from these various polymers are known in the art, particularly in reference to the preparation of ultrafiltration and microfiltration membranes. The porous substrate is preferably of a composition that is not adversely affected in the preparation of the composite membranes, such as by chemical attack by the solutions used in the interfacial reaction or by processing or drying steps in the making of the membranes of the invention. Porous substrates made of polysulfone resins are particularly known and used in the art.

Porous substrates made from one or more of these polymeric resins are preferably supported on a backing of a woven or nonwoven polyester or polyolefinic web. The web serves as both a carrier and a reinforcement, providing good handling characteristics for the porous polymeric substrates. Such a combination is particularly advantageous in the preparation of spirally wound membrane modules for use in water treatment apparatus. Alternatively, the porous substrates may be utilized in the form of hollow fibers, whereto fibrous web supports are no longer generally of advantage, and the resulting device incorporating the composite membrane is commonly known and referred to as a hollow fiber module.

The finely porous surface of the porous substrate is impregnated with a solution of one of the two interfacial reactants. Wherein one of the two solutions is aqueous in nature, it is almost always preferable to impregnate the porous substrate with the aqueous solution. This solution customarily will contain a polyamine reactant, this polyamine reactant being capable of reacting with polyacyl halides to form polyamides. Impregnation of the substrate with the solution of the interfacial reactant need not be limited to the finely porous surface alone, but may involve the back side of the porous substrate as well, including even a fibrous web support if present. It is generally not advantageous to intentionally impregnate the substrate backside and fibrous web, particularly if residual unreacted chemicals are to be removed by subsequent washing processes.

The polyamine reactant present in the amine solution preferably has a minimum of two amino groups per monomer, and more preferably consists of a monomeric aromatic chemical compound having at least two acyl-halide-reactive amino groups therein. Examples of polyamines useful in the invention include o-phenylenediamine, m-phenylenediamine, p-phenylenediamine, 1,3,5-benzenetriamine, 4-chloro-1,3-phenylenediamine, 5-chloro-1,3-phenylenediamine, 3-chloro-1,4-phenylenediamine, fluoro-analogs of these chloro-diamines, benzidine, diaminobenzidines, alkyl and chloro-substituted derivatives of benzidine, and naphthyl-enediamines. Combinations of these amines may be employed as well. Oligomeric and polymeric polyamines may also be employed, but are generally not advantageous to use in place of the essentially monomeric polyamines as generally represented in the above list of examples. Preferred diamines include members of the group consisting of m-phenylenediamine, p-phenylenediamine, 1,3,5-benzenetriamine, 4-chloro-1,3-phenylenediamine, 5-chloro-1,3-phenylenediamine, 3-chloro-1,4-phenylenediamine, and fluoro-analogs of these chloro-diamines. Meta-phenylenediamine has been found to be particularly preferred as a polyamine reactant in the interfacial formation of the membranes of the invention.

The carrier for the polyamine or combination of polyamines typically will comprise water in which the polyamine reactant is present in an amount that may vary in a range from about 0.1 to about 20 wt %, more preferably from about 1.0 to about 10 wt %, most preferably from about 1.5 to about 4 wt % (percent by weight). The aqueous solution may also contain other ingredients as well, including surfactants such as sodium lauryl sulfate or sodium dodecylbenzenesulfonate, and acid acceptors such as sodium acetate, sodium bicarbonate and/or triethylamine. The aqueous polyamine solution may also contain amine salts such as disclosed in U.S. Pat. Nos. 4,872,984 and 4,948,507, a particularly useful amine salt being the combination of camphorsulfonic acid with triethylamine. The aqueous polyamine solution is preferably nonturbid in appearance and optimally free from suspended matter such as dust, undissolved chemicals, or precipitated matter.

The monohydric phenol present in the aqueous solution of the polyamine reactant as an additive may consist of any chemical compound having in its chemical structure a single hydroxyl group attached to an aromatic ring. Such compounds may contain either one ring or a plurality of rings in their chemical structure, and may have substituent groups other than hydroxyl also attached to the aromatic ring or rings, but have one and only one hydroxyl group attached via an aromatic ring. Such compounds should show a minimum solubility of about 1.0 gram per liter in water within the temperature range of from about 0° C. to about 40° C. Such monohydric phenols preferably do not have substituent groups that spontaneously react ionically or covalently with aromatic amines in the aqueous polyamine solution such as to generate insoluble byproducts unsuitable to the intended interfacial reaction with the polyacyl halide reactant, or inactivate the polyamine reactant such that no useful interfacial membrane can be established on the porous substrate. Particularly preferred are simple one-ring phenolic compounds, including phenol, guaiacol, m-methoxyphenol, p-methoxyphenol, o-fluorophenol, m-fluorophenol, p-fluorophenol, o-cresol, m-cresol, and p-cresol. Guaiacol has shown particularly remarkable enhancement of membrane fluxes combined with retention of excellent salt rejections. These phenolic compounds may be used alone or in combination as flux-increasing additives in the polyamine reactant solution. The concentration of the monohydric phenol may vary in the range of from about 0.1 to about 9.9 wt % of the amine solution, more preferably from about 0.3 to about 5 wt %, most preferably from about 0.5 to about 3 wt %. Various substituted phenols will generally be limited to a range of less than 5 wt % due to natural solubility limits, and such limits can be determined easily through published solubility data, or in absence thereof, through simple solubility tests. Solubility of the monohydric phenol in an aqueous solution of a polyamine reactant may be further decreased at times by inclusion of other solutes, such as for example the amine salts described in U.S. Pat. Nos. 4,872,984 and 4,948,507. On the other hand, solubility limits of the monohydric phenols may be increased by addition of solubilizing agents to the polyamine reactant solution. Typical solubilizing agents include water-miscible solvents such as, for example, acetonitrile, acetone, or a low molecular weight alcohol. Particularly preferred is an alcohol such as isopropanol. Thus, in some embodiments of the invention, the solution of the polyamine reactant may include in addition to the monohydric phenol one or more of the following: an amine salt, a surfactant, an acid acceptor, and a solubilizing agent such as isopropanol.

The monohydric phenols may associate with aromatic polyamines in solution by an acid-base pairing attraction, forming weak acid/weak base complexes. These complexes, if present, do not appear to interfere in the formation of the interfacial membranes of the invention.

Monohydric phenols with the highest solubility in water do not necessarily show the greatest enhancement of water flux in resulting composite membranes. Thus, phenol is known to have excellent solubility in water, but superior flux enhancement occurs with guaiacol which exhibits far less solubility in water than phenol.

Aqueous solutions of the polyamine and the phenolic compound additive preferably have a pH of less than 10, so that the phenolic compound is not converted to a phenolate salt. Amino groups are generally known to react with acyl halides at a far greater rate than phenolic hydroxyl groups. Conversion of the phenolic compound to the phenolate salt at high pH tends to greatly increase the chemical reactivity of the phenolic compound toward the acyl halide, resulting in an interfacial polymerization reaction product that may not necessarily be predominantly polyamidic, and may be subject to loss of optimal flux and salt rejection characteristics. Incidental incorporation of the phenolic compound into the desired polyamidic layer via ester linkages may occur, and is believed to occur, within the boundaries of the present invention. Such incorporation would result in a plurality of pendant phenolate ester groups within the polyamidic layer, and such pendant groups may contribute to structural disorder and enhanced hydraulic permeability in this substantially polyamidic reaction product.

Application of the aqueous solution containing the polyamine reactant and the monohydric phenol onto a porous substrate may be made by one of several methods including dipping, spraying, slot-die-coating, knife-coating, transfer roll application or sponging. Contact of the liquid solution with the porous substrate is generally maintained for a period of between 0.1 second and 10 minutes, preferably for a period of between 1 and 100 seconds, during which the finely porous surface of the porous substrate (the surface upon which it is desired to deposit the interfacial reaction product) becomes impregnated with the polyamine solution. Excess polyamine solution is then preferably removed by one or more methods, including for example draining, air-knife treatment, nip roller contact, squeegee roller contact, wire-wound rod contact, or sponging. Methods which do not physically mar the surface of the porous substrate are particularly preferred. It is found advantageous that remaining liquid solution on the top surface of the porous substrate be further dried after removal of excess solution, generally by some type of air-drying method at ambient or mildly elevated temperatures within the range of about 15 to about 50° C.

The top surface of the porous substrate coated with the polyamine reactant and monohydric phenol is then brought into contact with a nonaqueous solution containing the polyacyl halide reactant for a time sufficient to form a coherent film by interfacial reaction, i.e., chemical reaction at or approximate to the interface between the coated substrate and the nonaqueous solution. Such time may be for a period of between 0.1 second and 10 minutes, preferably of between 1 and 100 seconds. Application of the nonaqueous solution of the amine-reactive reactant may be by one of several methods including dipping, spraying, slot-die coating, knife-coating, transfer roll application or sponging. Application methods which do not cause any significant stirring at the solution interface are preferable, the dipping method being particularly preferred.

The polyacyl halide reactant consists of a chemical compound or combination of chemical compounds having a plurality of acyl halide groups ranging from a minimum of 2 to as high as 6 such groups per compound or combination. The polyacyl halide compounds may be aliphatic, cycloaliphatic or aromatic in nature, including isophthaloyl chloride, terephthaloyl chloride, 1,3,5-benzenetricarbonyl chloride (trimesoyl chloride), 1,2,4-benzenetricarbonyl chloride (trimellitoyl chloride), 1,2,3,4-furantetracarbonyl chloride, 1,3,5-cyclohexanetricarbonyl chloride, 5-isocyanato-1,3-benzenedicarbonyl chloride, adamantane-2,6-dione-1,3,5,7-tetracarbonyl chloride, and halo analogs of these compounds such as the carbonyl fluorides and carbonyl bromides. Polymeric polyacyl halides may also be employed, but are generally not advantageous to use in place of the essentially monomeric polyacyl halides as generally represented in the above list of examples. Aromatic polyacyl halides are preferred in making membranes according to this invention. Particularly preferred are trimesoyl chloride or combinations of trimesoyl chloride with isophthaloyl or terephthaloyl chloride.

For good interfacial film formation, it is highly preferable to develop crosslinking in the interfacial polymer formation step, and this is most conveniently done by having an average acyl halide functionality of at least about 2.05 groups per polyacyl halide reactant. Thus, a ratio of acyl halide functionality greater than 2, that is, 2.05 or higher, is customarily employed, and the resulting polyamide reaction product is accordingly crosslinked. In the case of a difunctional acyl halide such as isophthaloyl chloride, a minimal concentration of a higher functionality acyl halide such as trimesoyl chloride is desired so as to achieve a crosslinking composition having about 2.05 or greater average of reactive functional groups present. Trimesoyl chloride itself, having a functionality of 3, may be used alone to very good effect in the interfacial polymerization step with the polyamine reactant in producing a crosslinked polyamidic layer. The concentration of the polyacyl halide component in the nonaqueous solution may vary in a range from about 0.01 to about 20 wt %, more preferably from about 0.03 to about 5.0 wt %, most preferably from about 0.05 to about 1.0 wt %.

Nonaqueous solvents useful for polyacyl halide solutions include hydrocarbons, chlorinated hydrocarbons, and fluorochlorohydrocarbons. Nonaqueous solvents should be chosen such that no prominent solubility exists in water that would deleteriously affect the interfacial reaction, and further that no significant damage occur to the porous substrate to which the nonaqueous solvent may come into incidental contact. Particularly preferred from an environmental viewpoint are hydrocarbon solvents that are aliphatic and nonhalogenated, examples being hexane, heptane, octane, and various nonaromatic petroleum distillates. Such hydrocarbons may not necessarily hold some aromatic polyacyl halides in solution throughout the full concentration range that is preferred, but nevertheless will generally provide workable concentrations sufficient to the interfacial formation of coherent semipermeable films. Particularly preferred on the basis of safety as well as environmental factors are high flash point nonaromatic petroleum distillates.

Excess polyacyl halide solution may be removed prior to oven drying, using one or more methods such as draining, air-knife treatment, nip roller contact, squeegee roller contact, wire-wound rod contact, or sponging. Methods not requiring physical contact are particularly preferred in removing excess polyacyl halide solution.

Composite membranes formed by interfacial reaction between the polyamine reactant and the polyacyl halide reactant in the presence of the monohydric phenol may be further processed in steps conventionally known in the art, including washing, treatment with rewetting agents, and drying. Such steps may include passage of the freshly formed composite membrane through aqueous alkaline solutions for neutralization of acyl halide residuals, cold or hot water for extraction of unreacted chemicals, and dip or spray contact with rewetting agents such as glycerine, surfactants, or a combination thereof. Impregnation of washed membrane with rewetting agents is particularly desirable for membrane flux retention when such washed membrane is subjected to an oven drying step.

In the most preferred embodiment of the invention as currently contemplated, a web-supported porous polysulfone substrate is dip-coated with an aqueous solution containing m-phenylenediamine, an amine salt as disclosed in U.S. Pat. No. 4,872,984, a monohydric phenol, and a surfactant; the coating is partially air-dried, and the coated substrate is then exposed to a nonaqueous solution of trimesoyl chloride for a sufficient time to deposit a continuous substantially polyamidic layer on and/or within the surface of the porous substrate. The resulting composite membrane is dried in an oven at an elevated temperature to remove the nonaqueous solvent, is subsequently washed with a neutralization solution and with water, and then is treated with a rewetting agent, followed by drying once again in an oven at an elevated temperature to remove substantially all of the residual water remaining in the membrane. The resulting membrane exhibits an increased flux due to the presence of the monohydric phenol in the reaction step, and preferably a flux of at least about 40 gallons per square foot of membrane area per day and a salt rejection of about 99% or higher, measured according to a typical brackish water test at 225 psig as commonly used in the art.

In the following examples, membranes were formed by interfacial polymerization on a porous polysulfone substrate coated on a nonwoven polyester fabric. The porous polysulfone substrate was prepared by applying a casting dope to a nonwoven polyester web in a continuous manner on a machine. The casting dope consisted of 15% by weight polysulfone resin dissolved in 70% by weight N,N-dimethylformamide and 15% by weight methyl cellosolve. The coated web was quenched in water to gel the polysulfone into a porous form, and residual solvent was removed by rinsing in water. Sections of the resulting porous polysulfone substrate were cut into 8-inch by 12-inch pieces and used in hand fabrication of membrane samples according to the invention.

Each sample of porous polysulfone substrate was first contacted with an aqueous solution of a reactive polyamine and monohydric phenol additive, followed by air-drying of the coated surface, then contacted with a nonaqueous solution of an acyl halide, followed by oven drying to remove the nonaqueous solvent. The resulting membrane was neutralized in a bath containing 0.2 wt % sodium carbonate and 3.3 wt % sodium sulfate for 20 seconds, then rinsed in water for 12 minutes. Any significant defects in the hand-coated membrane were made visible by spraying the membrane with a dye solution containing 500 mg/liter of rhodamine B, which preferentially stained polysulfone in any regions where the interfacial membrane incompletely covered the polysulfone substrate. The membranes were then dipped in an aqueous solution containing 0.3 wt % sodium lauryl sulfate and 5 wt % glycerine for 100 seconds, then dried in a 90° C. oven for six minutes.

Membrane performance was tested at 225 psig, using a 0.2 wt % sodium chloride aqueous feed solution. Permeate flux was measured volumetrically and salt concentrations were measured conductimetrically. Permeate flux is expressed in gallons per square foot of membrane area per day, commonly abbreviated to gfd. Salt rejection is expressed as a percentage, and was calculated according to the formula: (feed concentration−permeate concentration)/feed concentration×100%. All solution concentrations in the following examples are expressed in weight percent.

EXAMPLE 1

A membrane was prepared by the above method wherein the aqueous amine solution contained 1.9% meta-phenylenediamine (MPD), 1.6% phenol, 0.2% sodium lauryl sulfate (SLS), and 6.6% of an amine salt made from camphorsulfonic acid and triethylamine adjusted to pH 7. The top surface of the porous polysulfone substrate was contacted with the aqueous MPD/phenol solution for 8 seconds, then drained for approximately 20 seconds. Excess MPD/phenol solution was removed by rolling the top surface with a squeegee roller. The top surface was then allowed to dry in air over a 4-minute period. The top surface was then contacted with a nonaqueous solution of 0.18% by weight trimesoyl chloride (TMC) in Isopar G (trademark of Exxon Corp) for a period of 14 seconds. The resulting membrane was drained for 1 minute, then dried in an oven at 90° C. for 4 minutes. It was washed as described above, then re-dried before placing in a test cell for reverse osmosis testing with the 0.2% sodium chloride solution. This membrane exhibited a flux of 46.5 gfd and a salt rejection of 98.7%, tested at 225 psig and 25° C.

COMPARATIVE EXAMPLE A

A membrane was prepared by the same procedure as in Example 1, except that phenol was eliminated from the MPD solution. This comparative example exhibited 29.6 gfd and 99.3% salt rejection. Thus, the phenol additive produced a 58% increase in membrane flux, with a slight decrease in salt rejection.

EXAMPLE 2

A membrane was prepared by the method of Example 1, but using an aqueous solution containing 1.2% phenol in addition to the 1.9% MPD. Tested in the same manner, this membrane exhibited a flux of 45.1 gfd and a salt rejection of 99.3%. Thus, flux was increased by 54% over the comparative example, at equivalent salt rejection.

EXAMPLE 3

A membrane was prepared in the same manner as in Example 1 but with an aqueous amine solution containing 0.8% phenol. Tested in the same manner, this membrane exhibited a flux of 37.1 gfd and a salt rejection of 99.2%.

COMPARATIVE EXAMPLE B

An aqueous amine solution was prepared containing 1.9% MPD, 3.0% phenol, 0.2% SLS and 6.6% of the camphorsulfonic acid-triethylamine salt (amine salt). This solution was cloudy, due apparently due to separation of a portion of the phenol, due to the presence of the amine salt. A membrane, prepared by the procedure of Example 1 but using this solution, gave a coating that appeared to have incomplete coverage of the polysulfone surface. This was indicated by surface staining when the membrane was contacted on the coated face with a solution of rhodamine B dye. Tested in the same manner as before, the membrane showed inordinately high flux and essentially no salt rejection.

EXAMPLES 4–7

A series of membranes were prepared by the method of Example 1, but using various substituted monohydric phenols as well as phenol itself, and an MPD concentration of 2.0%. Data on the amine solution additives are given in Table 1. In the case of Example 7, isopropanol (IPA) was added to maintain a clear solution, where the phenolic compound would otherwise partially separate, resulting in a cloudy solution. Comparative Example D is provided where IPA was added but the phenolic compound was not present.

TABLE 1

| Example. No. | Phenolic Compound | Conc. (wt %) | IPA (wt %) |
|---|---|---|---|
| 4 | m-fluorophenol | 0.9 | 0 |
| 5 | guaiacol | 1.2 | 0 |
| 6 | guaiacol | 2.6 | 0 |
| 7 | o-cresol | 1.2 | 10 |
| Comp. Ex. D | none | 0.0 | 10 |

Reverse osmosis test results for membranes prepared with the amine solutions identified in Table 1 are shown in Table 2. These results indicate that in almost every case, a membrane with superior flux and remarkable salt rejection was achieved. Comparative Example D (run with repeat samples), wherein no monohydric phenol additive was used, showed that IPA itself showed some flux enhancement, improving fluxes to approximately as high as the o-cresol case, but with somewhat poorer salt rejections.

TABLE 2

| Example. No. | Flux (gfd) | Salt Rejection (%) |
|---|---|---|
| 4 | 56.6 | 99.6 |
| 5 | 55.3 | 99.5 |
| 6 | 69.8 | 99.4 |
| 7 | 39.1 | 99.1 |
| Comp. Ex. D | 39.9, 38.1 | 98.5, 99.0 |

In addition to these examples, membranes were made with 3% phenol in the amine solution at MPD concentrations of 2.0 and 4.0%, containing also 10% IPA to maintain clear solutions. At this particular concentration level of phenol, resulting membranes did not have complete surface coverage by the interfacial membrane, as indicated by dyeing, and no useful reverse osmosis test data were generated.

The above examples illustrate the beneficial action of monohydric phenols in augmenting the permeate flux of interfacially polymerized polyamidic composite membranes while retaining excellent solute rejection characteristics in preferred ranges of usage of the monohydric phenol. Thus, semipermeable composite membranes were prepared that exhibited permeate fluxes ranging from about 40 gfd to about 70 gfd, while retaining salt rejections of about 99% and greater, when prepared in the presence of monohydric phenols, this combination of characteristics being measured in a commonly used reverse osmosis test employing 0.2% sodium chloride aqueous feed solution at 225 psig hydraulic transmembrane pressure. Changes and modifications in the specifically described embodiments may be carried out without departing from the scope of the invention which is intended to be limited only by the scope of the appended claims, which follow.

We claim:

1. A process for preparing a semipermeable composite membrane, comprising the steps of coating a porous substrate with an aqueous solution comprising a polyamine reactant and a monohydric phenol, and contacting the coated substrate with a nonaqueous solution comprising a polyacyl halide reactant for a time sufficient to form an interfacially polymerized polyamidic layer on said substrate, thereby generating a composite membrane, said membrane having an increased flux due to presence of the monohydric phenol in said aqueous solution.

2. The process of claim 1 wherein the monohydric phenol includes at least one member of the group consisting of phenol, guaiacol, m-methoxyphenol, p-methoxyphenol, o-fluorophenol, m-fluorophenol, p-fluorophenol, o-cresol, m-cresol, and p-cresol.

3. The process of claim 2 wherein the polyamine reactant has an average of at least two amine functional groups and the polyacyl halide reactant has an average of at least 2.05 acyl halide functional groups.

4. The process of claim 3 wherein the monohydric phenol is present at a concentration in the range of about 0.1 to about 9.9 percent by weight.

5. The process of claim 4 wherein the monohydric phenol is present at a concentration in the range of about 0.5 to about 3.0 percent by weight.

6. The process of claim 4 further comprising steps of drying the semipermeable membrane at an elevated temperature of from about 50° C. to about 120° C., washing the dried membrane, treating the washed membrane with a rewetting agent, and drying the treated membrane at an elevated temperature of from about 50° C. to about 120° C.

7. The process of claim 2 wherein a water-miscible solvent is added to the aqueous solution comprising the polyamine reactant and the monohydric phenol.

8. The process of claim 7 wherein the water-miscible solvent is an alcohol.

9. The process of claim 1 wherein the monohydric phenol is present at a concentration in the range of about 0.1 to about 9.9 percent by weight.

10. The process of claim 9 wherein the monohydric phenol is present at a concentration in the range of about 0.5 to about 3.0 percent by weight.

11. The process of claim 9 further comprising steps of drying the semipermeable membrane at an elevated temperature of from about 50° C. to about 120° C., washing the dried membrane, treating the washed membrane with a rewetting agent, and drying the treated membrane at an elevated temperature of from about 50° C. to about 120° C.

12. The process of claim 9 wherein a water-miscible solvent is added to the aqueous solution comprising the polyamine reactant and the monohydric phenol.

13. The process of claim 12 wherein the water-miscible solvent is an alcohol.

14. A semipermeable composite membrane comprising an interfacially polymerized layer deposited on a porous substrate, said layer comprising a substantially polyamidic reaction product formed from reaction of a polyamine reactant with a polyacyl halide reactant, said reaction product being formed in the presence of a monohydric phenol, the composite membrane being characterized by a combination of a water flux of at least about 40 gallons per square foot of membrane area per day and a salt rejection of at least about 99%, measured against 0.2 wt % aqueous sodium chloride solution at 225 psig pressure, said combination being attained as a result of the presence of said monohydric phenol.

15. The membrane of claim 14 wherein the monohydric phenol includes at least one member of the group consisting of phenol, guaiacol, m-methoxyphenol, p-methoxyphenol, o-fluorophenol, m-fluorophenol, p-fluorophenol, o-cresol, m-cresol, and p-cresol.

16. The membrane of claim 15 wherein the polyamine reactant includes at least one member of the group consisting of o-phenylenediamine, m-phenylenediamine, p-phenylenediamine, 4-chloro-1,3-phenylenediamine, 5-chloro-1,3-phenylenediamine, 3-chloro-1,4-phenylenediamine, and 1,3,5-benzenetriamine.

17. The membrane of claim 15 wherein the polyacyl halide reactant includes at least one member of the group consisting of isophthaloyl chloride, terephthaloyl chloride, trimesoyl chloride, and 1,3,5-cyclohexanetricarbonyl chloride.

18. The membrane of claim 14 wherein the substantially polyamidic reaction product contains a plurality of pendant phenolate ester groups incorporated therein by reaction of said monohydric phenol with said polyacyl halide reactant.

19. The membrane of claim 18 wherein the monohydric phenol includes at least one member of the group consisting of phenol, guaiacol, m-methoxyphenol, p-methoxyphenol, o-fluorophenol, m-fluorophenol, p-fluorophenol, o-cresol, m-cresol, and p-cresol.

* * * * *